Nov. 11, 1924.
W. L. FOSTER
1,515,100
REAR CLUTCH FOR MOTOR VEHICLES AND THE LIKE
Filed July 31, 1922
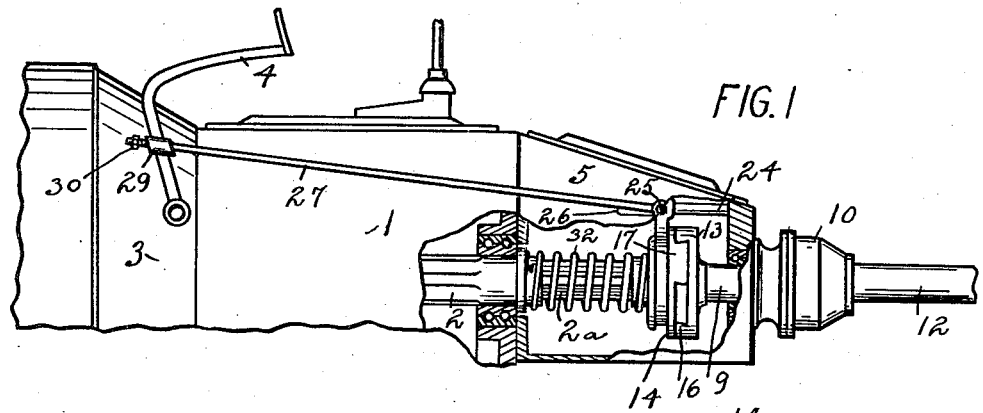
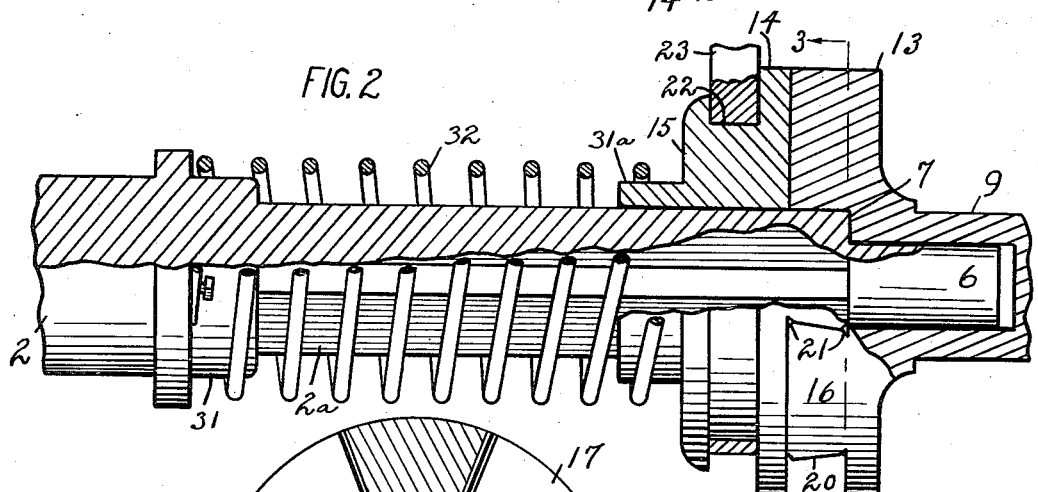
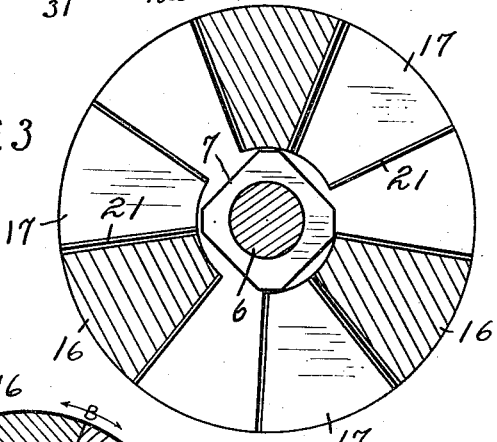
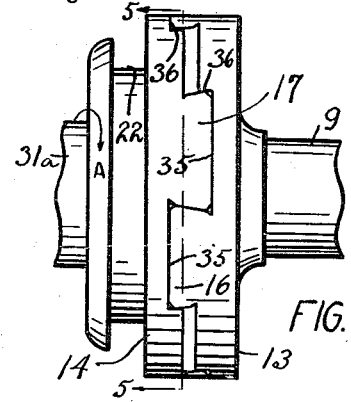
WALTER L. FOSTER
INVENTOR.
BY R. W. Smith
ATTORNEY Patented Nov. 11, 1924.

1,515,100

UNITED STATES PATENT OFFICE.

WALTER L. FOSTER, OF WHITTIER, CALIFORNIA, ASSIGNOR, BY DIRECT AND MESNE ASSIGNMENTS, OF TWENTY-FOUR ONE-HUNDREDTHS TO HERMAN C. SMITH AND TWENTY-FOUR ONE-HUNDREDTHS TO CHRIS ALLEN, BOTH OF WHITTIER, CALIFORNIA.

REAR CLUTCH FOR MOTOR VEHICLES AND THE LIKE.

Application filed July 31, 1922. Serial No. 578,614.

*To all whom it may concern:*

Be it known that I, WALTER L. FOSTER, a citizen of the United States, residing at Whittier, county of Los Angeles, State of California, have invented new and useful Improvements in Rear Clutches for Motor Vehicles and the like, of which the following is a specification.

This invention is applicable to drive mechanism having a change speed transmission, such as is employed in motor vehicles, motor boats, and the like.

It is the object of the invention to provide means whereby both ends of the change speed transmission may be readily disconnected from the drive mechanism, in order to simplify the operation of shifting gears.

When shifting the gears of a motor vehicle, the clutch is first released, so as to disconnect the engine, and the gears are then moved to the desired position and reengaged, the drive shaft of the transmission, in constructions employed heretofore, remaining fixed with relation to the shaft which transmits power to the drive axle.

The continued movement of the vehicle thus causes the shaft of the transmission to rotate after the clutch has been released, and while the gears are being shifted. As a consequence, proper shifting of the gears and reengagement of the same is often exceedingly difficult and may result in stripping of the teeth from the gears.

In the present invention, when the main clutch has been released, a rear clutch provided in the driving mechanism between the change speed transmission and the driven shaft, which is connected to the drive axle, may be also released. The continued rotation of the driven shaft by the momentum of the vehicle, will therefore not affect the transmission, and the gears may be readily shifted and reengaged as they come to a state of rest, without necessitating the exercise of particular skill, and without the liability of damaging the gears.

The invention will be readily understood from the following description of the accompanying drawings, in which:

Fig. 1 is a side elevation, partly broken away, of the drive mechanism for a motor vehicle constructed in accordance with the invention.

Fig. 2 is a side elevation, partly in axial section, of the rear clutch construction.

Fig. 3 is a transverse section on the line 3—3 of Fig. 2.

Fig. 4 is a side elevation showing a modified form of the rear clutch construction.

Fig. 5 is a transverse section on the line 5—5 of Fig. 4.

I have shown the invention as applied to the drive mechanism of a motor vehicle including the usual change speed transmission housed within casing 1, and having the main shaft 2. The front end of the transmission is connected to the engine in usual manner by a clutch housed within casing 3, said clutch having the usual operating pedal 4, adapted to release said clutch by depression of the pedal.

The rear end of shaft 2 of the transmission is extended beyond casing 1, into a casing 5 attached to the transmission casing. This extension of the shaft 2 is shown at $2^a$ as square in cross section, and terminates in a bearing stud 6 forming a shoulder 7 at the end of the squared portion of the shaft. A shaft 9 provided with a bore, is journaled upon stud 6, and extends through the rear end of casing 5. This shaft is connected by a universal joint received within casing 10, to the main drive shaft extending to the drive axle of the machine, said drive shaft being housed within casing 12.

A rear clutch is provided between the extension shaft $2^a$ and the shaft 9. As an instance of this arrangement, the inner end of shaft 9 may be provided with a disc plate 13 adjacent the shoulder 7 when the parts are assembled, and a cooperating disc plate 14 is formed upon a collar 15 which is received upon shaft $2^a$. The bore of collar 15 conforms to the squared shaft $2^a$, so that said collar will be rotated with shaft $2^a$, but may be moved lengthwise on said shaft.

The plates 13 and 14 are provided with jaws 16 and 17, respectively, said jaws projecting from the plates, axially toward each other. Two or more jaws may be employed upon each plate, and in the present embodiment of the invention, three jaws are provided on each plate, said jaws being equidistantly circumferentially spaced on their respective plates.

The space between adjacent jaws of each plate is preferably of greater circumferential width than the cooperating jaw of the other plate, and when plate 14 is shifted axially into operative position, the jaws 16—17 will intermesh in transverse alinement.

When shaft $2^a$ is rotated in one direction, one side of the jaws 17 will abut against the adjacent side of jaws 16, to cause rotation of shaft 9 with shaft $2^a$; and when the transmission mechanism is reversed, causing opposite rotation of shaft $2^a$, the jaws 17 will move through the spaces provided between jaws 16, so that the opposite side of the jaws 17 will abut against jaws 16, to cause reverse rotation of shaft 9 with shaft $2^a$.

It will thus be seen that when the clutch elements carried by plates 13—14 are in engagement, a positive driving connection is formed between shaft $2^a$ and shaft 9, irrespective of the direction of rotation of shaft $2^a$. Furthermore, when plate 14 is axially shifted to disengage the clutch elements, the shaft 9 is free to rotate, as the momentum of the vehicle continues to turn the same, without affecting the shaft $2^a$ and the transmission.

In order to retain the clutch elements in operative engagement during rotation of the same, the side walls of jaws 16 and 17 preferably converge from the outer ends of said jaws towards the bases of the same, as shown at 20. As a consequence, abutment of the sides of the jaws during rotation of the clutch mechanism, will draw the clutch elements axially towards one another, to insure a continued driving connection.

The outer ends of the contact sides of the jaws, as well as the bases of said sides, are preferably cut away as shown at 21, in order to provide for even wearing of the sides of the jaws, the cutting away of both the outer ends and the bases of said jaws, providing a double spacing at these points as clearly shown in Fig. 2, thereby increasing to a maximum the wear of the contact surfaces of the jaws, before abutment of the extreme outer ends and bases of cooperating jaws.

The collar 15 is normally shifted rearwardly to cause engagement of the clutch formed by jaws 16—17, and is adapted to be moved in the opposite direction to disengage the clutch, by the operation of clutch pedal 4.

For this purpose the collar 15 is provided with an annular recess 22 adapted to receive a shifting yoke 23. The yoke is shown as slidable upon a guide rod 24 mounted in casing 5, with a stud 25 projecting from said yoke through a slot 26 in the side of said casing. A connecting rod 27 is pivoted to this stud, and is actuated by pedal 4.

As an instance of this arrangement, the rod 27 may be received through a bearing 29 in the clutch pedal, with a nut 30 upon the end of the rod adapted to be impinged by said bearing when the pedal is depressed.

The nut is preferably adjustable along the rod, by means of a threaded connection, and is so positioned, that partial depression of pedal 4, sufficient to release the main clutch within casing 3, will not actuate rod 27, but continued depression of the pedal will operate the connecting rod, so as to shift yoke 23 and the clutch element formed by jaws 17.

It will thus be seen that the operation of the clutch pedal will first release the main clutch of the drive mechanism, and will then disengage the clutch elements 16—17, so that the transmission is disconnected at both ends.

Yieldable spring means are employed for normally engaging the elements 16—17 of the rear clutch. For this purpose a sleeve 31 is formed upon shaft $2^a$ just beyond the rear end of the transmission housing, and a sleeve $31^a$ is provided upon the collar 15. A coil spring 32 is mounted on extension shaft $2^a$, with its ends received on sleeves 31—$31^a$ and abutting against the shoulders formed thereby.

The spring as thus described will normally hold the elements of the rear clutch in engagement, but will yield to permit disengagement of said clutch when pedal 4 is fully depressed. As said pedal is first released, the spring 32 will cause engagement of the rear clutch, and the continued release of the pedal will then cause the main clutch to reengage. The spring 32 also counterbalances the end thrust of the driving connection, since said spring provides a longitudinal cushioning means between the shaft $2^a$ and the cooperating clutch elements 16—17.

The construction as thus set forth provides means whereby the change speed transmission of a driving mechanism may be disconnected at its rear end from the driven shaft, immediately after disengagement of the clutch connection between the front end of the transmission and the engine; and said transmission and driven shaft may be again positively connected in advance of the engagement of the main clutch. The transmission may thus be disconnected at both ends, in order to stop rotation of the same, and thereby permit the gears to be readily shifted.

A modified construction is shown in Figs. 4 and 5, whereby back lash in the rear clutch is eliminated, when the vehicle is moving forward. In this construction, the spaces between jaws 16 and 17 respectively, are provided with inwardly offset base portions 35 extending from one side of the jaws and terminating at their opposite sides in shoulders 36 spaced from the next adjacent jaws by non-offset portions of the spaces between the jaws. These offsets are so positioned, and of such width, as to receive the jaws of the opposite clutch element, when said elements are in operative engagement and arranged for rotation of the drive mechanism in a direction to cause forward movement of the vehicle, as indicated by arrow A in Figs. 4 and 5, and when the elements are in engagement for reverse rotation, the jaws are received in the non-offset portions of the spaces between the jaws of the opposite set.

The non-offset portion of the spaces between adjacent jaws are of a width somewhat less than the width of the jaws as shown in Fig. 5, the width of said non-offset portions being such, that when the clutch elements are engaged for rotation in a direction to cause forward movement of the vehicle, as indicated by arrow A in Figs. 4 and 5, the appreciable difference in the speed of rotation of the two clutch elements, together with the said reduction in the width of the non-offset portions of the spaces between the jaws, will cause jaws 16 and 17 to pass over the jaws of the cooperating clutch elements, and drop into offsets 35 of said cooperating clutch elements, without first striking said non-offset portions of the spaces between adjacent jaws.

With the jaws received in the offsets of the opposite clutch element, one side of each set of jaws will abut against one side of the opposite set of jaws, while the other side of each set of jaws will be in position for abutment against the shoulders 36 of the opposite clutch element, should there be a tendency towards relative movement of the jaws in opposite directions as indicated by arrow B in Fig. 5 to disengage the contacting sides thereof. The jaws, by said abutment, will thus be held against back lash and in operative engagement, until the clutch elements are disconnected, as previously described.

It will be apparent that various changes may be made in the construction, combination, and arrangement of parts, as thus described, without departing from the spirit of the invention.

What is claimed is:

1. A clutch connection comprising rotatable plates having circumferentially spaced axially projecting jaws arranged for circumferential abutment of the jaws of said plates, the respective jaws having inwardly converging contact sides, the spaces between the jaws of each plate being of greater circumferential width than the jaws of the cooperating plate, and offsets in the bases of said spaces extending from one side of said jaws a distance subtantially equal to the circumferential width of the jaws of the cooperating plate and terminating in shoulders spaced from the next adjacent jaws so as to form non-offset portions of the bases of said spaces between said shoulders and the next adjacent jaws, said non-offset portions of the spaces between adjacent jaws being of a width less than that of said jaws.

2. A clutch connection comprising rotatable plates having circumferentially spaced axially projecting jaws arranged for circumferential abutment of the jaws of said plates, the respective jaws having their contact sides cut away at the bases and at the outer edges of said sides, the spaces between the jaws of each plate being of greater circumferential width than the jaws of the cooperating plate, and offsets in the bases of said spaces extending from one side of said jaws a distance substantially equal to the circumferential width of the jaws of the cooperating plate and terminating in shoulders spaced from the next adjacent jaws.

In testimony whereof I have signed my name to this specification.

WALTER L. FOSTER.